United States Patent [19]

Notari et al.

[11] B 3,989,805

[45] Nov. 2, 1976

[54] PROCESS FOR THE PRODUCTION OF ALUMINUM CHLOROHYDROXIDES HAVING A CONTROLLED CHLORINE CONTENT

[75] Inventors: Bruno Notari; Luigi Rivola, both of San Donato Milanese, Italy

[73] Assignee: Snam Progetti S.p.A., San Donato Milanese, Italy

[22] Filed: Feb. 28, 1973

[21] Appl. No.: 336,754

[44] Published under the second Trial Voluntary Protest Program on March 16, 1976 as document No. B 336,754.

[30] Foreign Application Priority Data

Mar. 1, 1972  Italy .................................. 21251/72

[52] U.S. Cl.............................. 423/462; 423/471
[51] Int. Cl.²....................... C01F 7/00; C01F 7/48; C01F 7/56; C01C 1/16
[58] Field of Search ............ 423/462, 495, 470, 471

[56] References Cited
UNITED STATES PATENTS 2,256,505   9/1941   Thompson ............................ 424/68
2,876,163   3/1959   Garizio et al. .................. 423/462 X

FOREIGN PATENTS OR APPLICATIONS 655,617   7/1951   United Kingdom ................. 423/495

OTHER PUBLICATIONS

Tanabe, "American Perfumer and Cosmetics," vol. 77, pp. 25–30, (Aug., 1962).

Edwards, "The Aluminum Industry," vol. I, 1st Edition, p. 172, (1930).

Primary Examiner—Edward Stern
Attorney, Agent, or Firm—Ralph M. Watson

[57] ABSTRACT

A process is described whereby aluminum chlorohydroxide having a controlled chlorine content is prepared by subjecting a mineral containing aluminum oxide or hydroxide (e.g. bayerite, gibbsite, diaspore, boehmite or alumina bayer) is subjected to a preliminary etching with hydrochloric acid at a temperature in the range from 110° to 150° C, the solution so obtained is neutralized with ammonia and the desired aluminum chlorohydroxide (e.g. $Al_2(OH)_5Cl$) is crystallized out.

1 Claim, No Drawings

PROCESS FOR THE PRODUCTION OF ALUMINUM CHLOROHYDROXIDES HAVING A CONTROLLED CHLORINE CONTENT

The present invention relates to a process for the production of aluminum chlorohydroxides having a controlled chlorine content.

It is known that aluminum chlorohydroxides are very important in preparing products which are very useful in the heterogeneous catalysis field. For instance, by gelling the chlorohydroxide having the formula $Al_2(OH)_5Cl$, spheroidal alumina is obtained which has important applications both in the field of catalysts for hydrocarbon refining and as a basis of catalysts for the combustion of polluting exhaust gases (for instance in internal combustion engines).

A serious draw-back has been the cost of the obtained catalysts which are remarkably affected by the cost of the starting materials necessary for the production of chlorohydroxide.

In fact the method previously known for the production of chlorohydroxide solution consists in reacting metallic aluminum with hydrochloric acid.

It has now been found, which is the subject of the present invention, that it is possible to obtain aluminum chlorohydroxides containing the desired amount of aluminum and chlorine by starting from cheaper materials, containing aluminum in the form of oxide or hydroxide.

According to the process of the present invention use may be made of alumina bayer, bayerite, gibbsite, hydrargillite, diaspore, boehmite of the more common types, but it is also possible to start from any type of aluminum oxide or hydroxide.

Among the aforesaid compounds, the cheapest starting material containing aluminum is alumina bayer: alpha — $Al_2O_3 \cdot 3 H_2O$, i.e. the product which is formed during the process for the purification of bauxite: by treating the mineral with soda, soluble sodium aluminate is formed which is filtered and then bayerite is precipitated by $CO_2$: sodium carbonate is recovered which is recycled to etch fresh bauxite.

The inventive process is based on an initial reacting of the starting material with hydrochloric acid, which gives rise to a product having an indefinite composition and usually having a chlorine content which is not suitable for the subsequent uses.

However we observed that, if the aforesaid material is treated with a base, a neutralization is performed and, if the pH is maintained below 3.6, a material can be obtained having the desired composition.

More particularly the inventive process consists in reacting the starting material with hydrochloric acid in aqueous solution in order to form aluminum chlorohydroxides having the formula $Al_2(OH)_xCl_y$ wherein the $x$ and $y$ values range from 2.5 to 3.5 and from 3.5 to 2.5 respectively with regard to the reaction procedure.

The reaction with hydrochloric acid is carried out at temperatures ranging from 110°C to 150°C, and, at the same temperature, the reaction rate is affected by the sizes of the particles of the employed aluminum compound. Peculiar advantages have been realized by using products having particles with a 500 – 1000 A diameter.

However the preparation of oxides and hydroxides having such small sizes is not convenient from an economic point of view. Therefore use can be made of materials having same micron sizes according to the inventive process.

The chlorohydroxide obtained from the starting reaction with hydrochloric acid is then subjected to a neutralization, by which we produce a compound of the desired composition.

The neutralization operation is quite general, but for obvious economical reasons it is carried out with ammonia.

Use can be made of an aqueous ammonia solution, or of gaseous anhydrous ammonia. The second possibility is the one we prefer because using an aqueous solution gives rise to drawbacks such as the necessity of a final concentration in order to restore the alumina titre.

An advantageous use is made of a gaseous anhydrous ammonia and dry $H_2$ (or dry air) in volume ratios ranging between 1/20 and 1/1.

The neutralization is carried out by continuously controlling the pH and is stopped when the pH reaches prefixed values, ranging between 2.7 and 3.1 measured at 70°C in the presence of all $NH_4Cl$.

The employment of ammonia as neutralizing agent gives rise to ammonium chloride which may be then separated by a crystallization. The best crystallization conditions are reached when chlorohydroxide is brought to a temperature of from 0° to 25°C.

Ammonium chloride gives rise to macrocrystals having a dendrite branching which makes the separation very easy. By working under these conditions, a separation is performed of from 50 to 70% of the ammonium chloride formed in the neutralization.

The value of the final pH, after the separation by crystallization of two thirds of the ammonium chloride, was determined by the type of desired chlorohydroxide and, hence, the uses it is destined to.

Ammonium chloride, obtained as by product, treated with calcium hydroxide, can be utilized in order to restore ammonia necessary to neutralization, thus further lowering the costs of chlorohydroxide production.

The invention will be better understood after the study of the following examples.

EXAMPLE 1

Use was made of commercial Alumina Bayer whose particles had 40 – 70 $\mu$ diameter ($Al_2O_3 \cdot 3H_2O$), having the following nominal composition (by weight):

| | | |
|---|---|---|
| $Al_2O_3$ | 64.9– 65.1 | % |
| Total $Na_2O$ | 0.4 | % |
| Soluble $Na_2O$ | 0.045 | % |
| Si | 0.009 | % |
| Fe | 0.012 | % |
| Ti | 0.003 | % |
| P | 0.001 | % |
| V | 0.0005 | % |
| $H_2O$ at 110°C | 0.1 | % |
| $H_2O$ at 1000°C | 35.0 | % |

Bayerite was reacted with an aqueous solution of hydrochloric acid at 37% ($d = 1.19$) (analytical purity reagent).

The etching was carried out as follows:

100 kg of commercial Alumina Bayer were mixed with 100 kg of HCl in a Pyrex glass or enameled steel reactor at a temperature of from 120° to 140°C, the reactor being kept under an inert gas atmosphere of from 0.8 to 1.5 kg/cm² and strong mechanical stirring.

After a 4 hour run the suspension was diluted by 25 liters of distilled water containing 100 g of HCl ($d = 1.19$), discharged from the reactor and centrifuged after cooling at a temperature of from 50° to 85°C, by means of a heat exchanger.

As a consequence of reacting 50% of the fed commercial Alumina Bayer (about 50 kg.) is solubilized. Therefore the residual solid in the centrifuge is put again in the reactor and the starting amount was restored with 50 kg of fresh bayerite.

100 kg of HCl ($d = 1.19$) were added to the reactor and the etching run again as aforesaid.

The composition, pH and the density of the chlorohydroxide obtained at the end of the reaction after the removal of the residual solid were the following ones:

| | | |
|---|---|---|
| $Al_2O_3$ | 19.5– 20.5 | % (by weight) |
| Cl | 21.0– 22.0 | % (by weight) |
| Fe | 80 | p.p.m. |
| Na | 1350 | p.p.m. |
| $d20°C$ | 1.39– 1.42 | |
| pH 20°C | 0.85– 1.00 | |

The weight ratio between Al and Cl is so 0.46 – 0.54 corresponding to an approximate composition of $Al_2(OH)_3Cl_3$.

100 kg of the chlorohydroxide coming from the reaction with with HCl were introduced into the neutralization reactor, brought to 65° – 75°C under a strong mechanical stirring: 7.2 – 7.8 kg of gaseous anhydrous ammonia were slowly added, mixed with dry $N_2$ (volume ratios $NH_3/N_2$ of from 1/10 to 1/1), at a $NH_3$ flow of from 120 to 1200 Nmc/h.

The $N_2 + NH_3$ mixture was then fed to the porous candles in Pyrex glass (grain 61).

In order to reduce the formation of scales (due to precipitation of alumina gel because of the high local ammonia concentration) the stirring was performed at a rate of 80 – 140 rounds per minute and the ammonia flow (during the starting phase) was reduced at minimum (120 Nmc/h) at a volume ratio $NH_3/N_2 = 1/10$. The aforesaid considered also the exothermicity of the neutralization secretion, which is highest at the beginning.

The porous candles had an useful porous apparent surface of 800 – 1000 $cm^2$.

In such conditions the neutralization time was 5 – 8 hours. The feeding of $NH_3$ was stopped when the pH (measured at 70°C by means of a system of external circulation with regard to the reactor) had a value of from 2.7 to 2.9. The neutralization reactor could be built of carbon steel covered with plastic materials (propylene) or rubber.

After neutralization the chlorohydroxide had an $NH_4Cl$ content equal to 21 – 22% by weight, which was to be reduced to values lower than 15% by a crystallization.

The crystallization was carried out at a temperature of from 10° to 15°C, under a slow mechanical stirring, over a period of 4 – 5 hours.

The control of $NH_4Cl$ crystallization was performed by means of conductivity measurements, which were based on the different electrolytic conductivity of $NH_4Cl$ and chlorohydroxide, and allowed to determine the concentration of ammonium chloride of the solution up to a precision of some percent.

The crystallization vessel could be built of carbon steel covered by rubber.

The composition, the density and pH of chlorohydroxide after the crystallization and separation of the residual solid were the following ones:

| | | |
|---|---|---|
| $Al_2O_3$ | 19 – 20 % | |
| Cl | 13.5 – 15 % | |
| Fe | 58 p.p.m. | |
| Na | 1670 p.p.m. | |
| $NH_4Cl$ (residual) | 6 – 9 % | |
| pH | 3.0 – 3.5 | |
| $d20°C$ | 1.31 – 1.33 | |

The so obtained chlorohydroxide is represented by the following formula: $Al_2(OH)_5Cl$.

EXAMPLE 2

This test shows one possible employment of aluminum chlorohydroxide prepared according to the inventive process.

The chlorohydroxide obtained from Alumina Bayer as described in the preceding example was employed for preparing spheroidal alumina according to the process of Italian Pat. No. 753,063 of same Applicant, which consists of gelling chlorohydroxide by dipping into a warm oil column (90°C) after cold mixing with an ammonium acetate solution (40°C), treating with anhydrous gaseous $NH_3$ (at 90°C), washing and crystallizing with an aqueous ammonia solution (5%) at 90°C over a period of 4 – 6 hours with regard to washing efficiency.

After drying at 110°C and calcination at 400°C under an inert gas stream ($N_2$ at a flow of 4000 liters per liter per hour) or under vacuum the $\gamma$—$Al_2O_3$ spheroids had the following characteristics:

| | | |
|---|---|---|
| Apparent density (°) | 0.72 – 0.76 | cc/g |
| Plane area (∞) (pH = 3.4) | 270 – 300 | $m^2/kg$ |
| Total volume of pores (∞∞) | 0.6 – 0.7 | cc/g |
| Spheroid diameter | 2.8 – 3.4 | mm |
| Na | 50 – 70 | ppm |
| Fe | 150 – 200 | ppm |
| | 100 – 150 | ppm |

To be noted is the high decrease of sodium which was reduced from 4000 ppm of the starting bayerite to 50 – 70 ppm of the produced $\gamma$—$AL_2O_3$. This was accomplished without increasing the washing and crystallization treatments of spheroidal alumina, and hence the costs relating thereto: it could be caused by the ionic change $Na^+ \cdot NH_4^+$ which occurred owing to the remarkable amount of ammonium ions which were present. (°) Measured on a 100 cc volume (∞) This value is a function of the final pH of chlorohydroxide (∞∞) Obtained from the measurements of real and apparent density

EXAMPLE 3

Chlorohydroxides have been prepared having an approximative composition $Al_2(OH)_{3.4}Cl_{2.6}$ starting from Alumina Bayer containing particles having a diameter between 2000 A and 4000 A, adding the powder to the aqueous solution of HCl ($d = 1.19$) at room temperature and then treating, under a vigorous mechanical stirring.

The amounts of the starting materials and the test conditions were:

| | |
|---|---|
| $Al_2O_3 \cdot 3 H_2O$ | 1000 g |
| H Cl | 1580 g |
| Temperature | 108 – 110°C |
| Time | 2 – 3 hours |

At the end of dissolution, the solution was clear, no solid residual being present, confirming the complete dissolution of bayerite.

The neutralization and crystallization were performed according to example 1, but use was made of a higher amount of ammonia. The obtained product was also $Al_2(OH)_5Cl$.

EXAMPLE 4

By this test we purposed to prove that the employment of different amounts of ammonia in the neutralization phase of the chlorohydroxide producing process was determinative of the composition of the final product.

The working procedure and conditions were equal to those of example 1.

The employed amounts of the reagents and the obtained chlorohydroxides are reported in the following table:

| H Cl (d = 1.19) g | Total Alumina Bayer g | Unreacted Alumina Bayer g | Adsorbed $NH_3$ g | Obtained chlorohydroxide g |
|---|---|---|---|---|
| 1000 | 1000 | 500 | — | $Al_2(OH)_3Cl_3$ |
| 1000 | 1000 | 500 | 24 | $Al_2(OH)_4Cl_2$ |
| 1000 | 1000 | 500 | 47 | $Al_2(OH)_5Cl$ |

EXAMPLE 5

Use was made of commercial boehmite with particles having 20 – 160μ diameter ($Al_2O_3 . H_2O$) and the following nominal composition:

| | | |
|---|---|---|
| $Al_2O_3$ | 75 | % |
| C | 0.3 | % |
| $SiO_2$ | 0.008 | % |
| $Fe_2O_3$ | 0.005 | % |
| $Na_2O$ | 0.004 | % |
| $TiO_2$ | 0.09 | % |

Boehmite was treated with an aqueous solution of hydrochloric acid at 37% (analytical purity reagent).

The reaction was carried out as follows: 87 kg of commercial boehmite were mixed with 100 kg of HCl in a Pyrex glass or enameled steel reactor, at a temperature between 120° and 150°C, the reactor being kept under an inert gas atmosphere ($N_2$) in the range between 1.2 and 2.2 kg/cm$^2$ and a strong mechanical stirring. After a 4 hour run the suspension was diluted with 34 liters of distilled water containing 150 g of HCl ($d = 1.19$), discharged from the reactor, and centrifuged after cooling at a temperature between 50° and 85°C, by means of a heat exchanger. The centrifuge was of the basket type. It was found that 50% of commercial boehmite (about 43.5 kg.) was dissolved.

Therefore the solid residue of the centrifuge was put again into the reactor and the charge was restored by 43.5 kg of fresh bohemite.

The composition, pH and the density of the chlorohydroxide obtained at the end of etching after the removal of the solid residue were the following ones:

| | | |
|---|---|---|
| $Al_2O_3$ | 19.5 – 20.5 | (by weight) |
| Cl | 21.0 – 22.0 | (by weight) |
| Fe | 20 | p.p.m. |
| Na | 20 | p.p.m. |
| $d20°C$ | 1.38 – 1.45 | |
| pH | 0.80 – 1.00 | |

The weight ratio between Al and Cl was 0.46 – 0.54 corresponding to an approximative composition of $Al_2(OH)_3Cl_3$. The neutralization with $NH_3$ and the crystallization of $NH_4Cl$ were carried out according to example 1.

The composition, pH and the density of the final chlorohydroxide after the crystallization and the removal of the solid residue were the following:

| | |
|---|---|
| $Al_2O_3$ | 10 – 20 % |
| Cl | 13.5 – 15 % |
| Fe | 20 ppm |
| Na | 90 ppm |
| $NH_4Cl$ (residual) | 6 – 8.5 % |
| pH | 3.0 – 3.5 |
| $d20°C$ | 1.30 – 1.33 |

The so obtained chlorohydroxide was schematized by the following formula: $Al_2(OH)_5Cl$.

EXAMPLE 6

Use was made of diaspore having particles with 10 – 100 μ diameter ($Al_2O_3 . H_2O$) and a nominal composition equal to the one of boehmite as disclosed in example 5. The reaction was carried out as follows:

87 kg of diaspore were mixed with 100 kg of HCl in a Pyrex glass or enameled steel reactor at a temperature between 110° and 140°C, the reactor being kept under an inert gas atmosphere ($N_2$) in the range between 0.8 - and 1.8 kg/cm$^2$ and a strong mechanical stirring.

After a 4 hour run the suspension was diluted with 34 liters of distilled water containing 150 g of HCl ($d = 1.19$) (analytical purity reagent), discharged from the reactor and centrifuged after cooling at a temperature between 50° and 85°C, by means of a heat exchanger. The centrifuge was of the basket type.

It was found that 50% of diaspore (about 43.5 kg.) was dissolved. Therefore the solid residue of the centrifuge was put again in the reactor, and the starting amount was restored with 43.5 of fresh diaspore.

The composition, pH and the density of chlorohydroxide obtained at the end of the etching after the removal of the solid residue are the ones referred to in example 5.

Also in the reaction with diaspore the weight ratio between Al and Cl ranged from 0.46 to 0.54 corresponding to an approximate composition of $Al_2(OH)_3Cl_3$.

The neutralization with $NH_3$ and the crystallization of $NH_4Cl$ were performed according to example 1.

The composition, pH and the density of the final chlorohydroxide (after the removal of the solid residue) were equal to the ones obtained in example 5.

The chlorohydroxide, thus obtained, had the following formula: $Al_2(OH)_5Cl$.

EXAMPLE 7

Use was made of gibbsite ($Al_2O_3 . 3H_3O$) having particles with 10 – 100 μ diameter and the same composition of bayerite as disclosed in example 1.

Gibbsite was reacted with an aqueous solution of HCl at 37% ($d = 1.19$) (analytical purity reagent).

The reaction was performed as follows:

100 kg of gibbsite were mixed with 100 kg of HCl in a Pyrex glass or enameled steel reactor at a temperature between 110° and 150°C, the reactor being kept under an inert gas atmosphere ($N_2$) in the range between 1.0 and 2.0 kg/cm$^2$ and a vigorous mechanical string.

After a 4 hour run the suspension was diluted with 25 liters of distilled water containing 100 g of HCl ($d = 1.19$), discharged from the reactor and centrifuged after cooling at a temperature between 50° and 85°C, by means of a heat exchanger. The centrifuge was of the basket type.

It was found that 50% of the fed gibbsite (about 50 kg) was dissolved. Therefore the solid residue of the centrifuge was put again in the etching reactor and the starting amount was restored with 50 kg of fresh gibbsite. 100 kg of HCl ($d = 1.19$) were again added to the reactor, and the etching started again as described above.

The composition, pH and the density of the chlorohydroxide obtained at the end of the etching after the removal of the solid residue were equal to the ones disclosed in example 1. Therefore the approximate composition of this chlorohydroxide was $Al_2(OH)_3Cl_3$.

The neutralization with $NH_3$ and the crystallization of $NH_4Cl$ were performed according to example 1.

The composition, pH and the density of the final chlorohydroxide (after the removal of the solid residual) were the ones obtained in example 1.

The chlorohydroxide, thus obtained, had the following formula $Al_2(OH)_5Cl$.

What we claim is:

1. The process for preparing, as end product, aluminum chlorohydroxide represented by the formula, $Al_2(OH)_5Cl$, which consists in reacting an aluminum compound having a particle diameter of 500–4000A selected from the group consisting of bayerite, gibbsite, diaspore and boehmite with 37% hydrochloric acid in aqueous solution at a temperature of 110°–150°C in the presence of an inert gas atmosphere of from 0.8 to 1.5 kg/cm$^2$ and under strong mechanical stirring of the reactants for a period of 4 hours to form aluminum chlorohydroxide represented by the formula, $Al_2(OH)xCly$ wherein the values of $x$ and $y$ range from 2.5 to 3.5 and from 3.5 to 2.5 respectively, then neutralizing said aluminum chlorohydroxide with aqueous or gaseous anhydrous ammonia to establish a pH in the solution in the range between 2.7 and 3.1 at a temperature of 65°–75°C under strong mechanical stirring conditions to prevent the precipitation of alumina gel and then separating ammonium chloride by crystallization in the form of macrocrystals having dendrite branching and thereafter recovering said aluminum chlorohydroxide.

* * * * *